(12) United States Patent
Lin

(10) Patent No.: US 7,356,631 B2
(45) Date of Patent: Apr. 8, 2008

(54) APPARATUS AND METHOD FOR SCHEDULING REQUESTS TO SOURCE DEVICE IN A MEMORY ACCESS SYSTEM

(75) Inventor: Wei-Fen Lin, Tainan County (TW)

(73) Assignee: Himax Technologies, Inc., Tainan County (TW)

( * ) Notice: Subject to any disclaimer, the term of this patent is extended or adjusted under 35 U.S.C. 154(b) by 99 days.

(21) Appl. No.: 10/905,801

(22) Filed: Jan. 21, 2005

(65) Prior Publication Data

US 2006/0168383 A1  Jul. 27, 2006

(51) Int. Cl.
G06F 13/14 (2006.01)

(52) U.S. Cl. .............. 710/243; 710/240; 710/310; 710/53; 711/167

(58) Field of Classification Search ........ 710/240–244, 710/111–112, 309, 53; 711/167–168
See application file for complete search history.

(56) References Cited

U.S. PATENT DOCUMENTS

| 6,067,301 | A  | * | 5/2000  | Aatresh ................ 370/418 |
| 6,157,963 | A  | * | 12/2000 | Courtright et al. ........... 710/5 |
| 6,253,262 | B1 | * | 6/2001  | Rozario et al. .............. 710/39 |
| 6,438,135 | B1 | * | 8/2002  | Tzeng ..................... 370/412 |
| 6,578,117 | B2 |   | 6/2003  | Weber |
| 6,738,386 | B1 | * | 5/2004  | Holmqvist ................ 370/412 |
| 6,745,262 | B1 | * | 6/2004  | Benhase et al. ............ 710/40 |
| 6,804,758 | B2 | * | 10/2004 | Liao et al. ................. 711/169 |
| 6,810,470 | B1 | * | 10/2004 | Wiseman et al. ........... 711/163 |
| 6,880,028 | B2 | * | 4/2005  | Kurth ..................... 710/240 |
| 6,934,294 | B2 | * | 8/2005  | Bertagna .................. 370/412 |
| 6,996,820 | B1 | * | 2/2006  | Middleton et al. ......... 718/100 |

* cited by examiner

Primary Examiner—Raymond N Phan
(74) Attorney, Agent, or Firm—Jianq Chyun IP Office

(57) ABSTRACT

An apparatus and method for scheduling requests to a source device is provided. The apparatus comprises a high-priority request queue for storing a plurality of high-priority requests to the source device; a low-priority request queue for storing a low-priority request to the source device, wherein a priority of one of the high-priority requests is higher than the priority of the low-priority request; a history counter for storing an information related to at least one requesting interval between two adjacent high-priority requests; and a scheduling module for scheduling the high-priority requests and the low-priority request according to the information.

9 Claims, 2 Drawing Sheets

APPARATUS AND METHOD FOR SCHEDULING REQUESTS TO SOURCE DEVICE IN A MEMORY ACCESS SYSTEM

BACKGROUND OF THE INVENTION

1. Field of Invention

The present invention relates to an apparatus and method for scheduling requests to a source device. More particularly, the present invention relates to an apparatus and method for scheduling requests to a source device according to requesting history.

2. Description of Related Art

In systems that are built on a single chip it is not uncommon that there are several independent initiators (such as microprocessors, signal processors, etc.) accessing a dynamic random access memory (DRAM) subsystem. The system may require different qualities of service (QOS) to be delivered for each of the initiators. Secondly, the memory ordering model presented to the initiators is important. Ideally, the initiators want to use a memory model that is as strongly ordered as possible. At the same time, the order in which DRAM requests are presented to the DRAM subsystem can have a dramatic effect on DRAM performance. Yet re-ordering of requests for thread QOS or DRAM efficiency reasons can compromise a strongly ordered memory model. What is required is a unified DRAM scheduling mechanism that presents a strongly ordered memory model, gives differential quality of service to different initiators, and keeps DRAM efficiency as high as possible.

The request stream from each different initiator can be described as a thread. If a DRAM scheduler does not re-order requests from the same thread, intra-thread request order is maintained, and the overall DRAM request order is simply an interleaving of the sequential per-thread request streams. Existing systems might order the requests at a different point in the system than where the DRAM efficiency scheduling occurs (if any is done), and/or the systems re-order requests within a processing thread. For example, requests may be carried from the initiators to the DRAM Controller via a standard computer bus. Request order (between threads and within threads) is established at the time of access to the computer bus, and is not allowed to be changed by the DRAM controller. Another example of DRAM scheduler is provided in U.S. Pat. No. 6,578,117 for achieving a high DRAM efficiency and QOS guarantees. In '117, a thread quality of service scheduler keeps and uses thread state to remember thread scheduling history and help it determine which thread should go next. For example, the scheduler might attempt to schedule requests that access the same DRAM page close to each other so as to increase the chance of getting DRAM page hits.

In further application, queues are used to store the requests and each queue is assigned a priority different from others such that requests in high-priority queue are performed first and requests in low-priority cannot be performed until all requests with higher priority are done. The priority-based schedule is widely used because more important requests are dealt first and performance could be better than normal scheduling method.

However, the priority-based schedule still has some drawbacks. One of the drawbacks is that the low-priority requests might block the high-priority requests. As many initiators submit requests randomly, all the high-priority quests might be finished and therefore the low-priority quests start to be performed. However, once a new high-priority request arrived when performing the low-priority quest, the high-priority request must wait until the low-priority request finishes. In such a condition, the high-priority request is delayed and performance is reduced.

SUMMARY OF THE INVENTION

In one aspect, the present invention provides an apparatus for scheduling requests to a source device. The apparatus comprises a high-priority request queue for storing a plurality of high-priority requests to the source device; a low-priority request queue for storing a low-priority request to the source device, wherein a priority of one of the high-priority requests is higher than the priority of the low-priority request; a history counter for storing an information related to at least one requesting interval between two adjacent high-priority requests; and a scheduling module for scheduling the high-priority requests and the low-priority request according to the information.

In another aspect, the present invention provides a scheduling method for scheduling requests to a source device, comprising: receiving a plurality of high-priority requests and a low-priority request, wherein a priority of each of the high-priority requests is higher than the priority of the low-priority request; storing an information related to at least one requesting interval between two adjacent high-priority requests; and scheduling the high-priority requests and the low-priority request according to the information.

In one embodiment of the present invention, when the information means there is enough time for operation of a first part of the low-priority request, the low-priority request is divided into the first part and at least another part, and the first part of the low-priority request is granted to request the source device.

In one embodiment of the present invention, the information comprises an average value of a plurality of requesting intervals, and the average value is obtained by weighting each of the requesting intervals and adding the weighted requesting intervals together.

Because the present invention considers the requesting intervals occurred in high-priority queue and scheduled the low-priority requests such that the low-priority requests are granted in the requesting intervals of the high-priority requests, the opportunity that the high-priority requests are blocked by the low-priority requests could be reduced.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
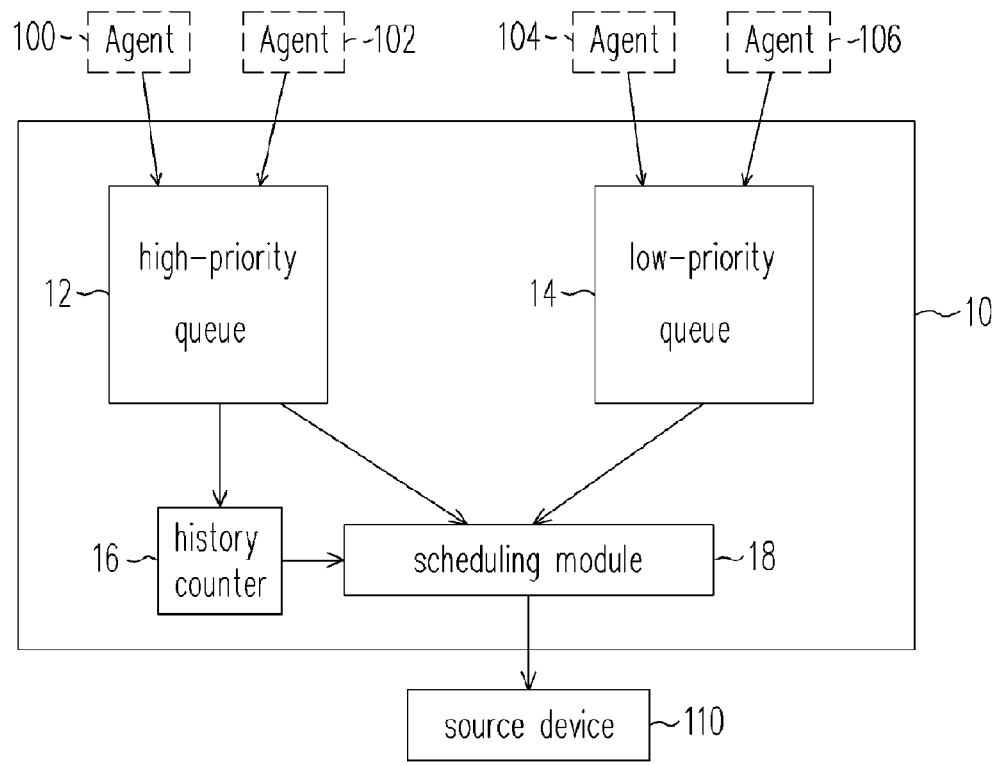
FIG. 1 is a block diagram shown an apparatus according to one embodiment of the present invention.

Reference will now be made in detail to the embodiments of the invention, examples of which are illustrated in the accompanying drawings. Wherever possible, the same reference numbers are used in the drawings and the description to refer to the same or like parts.

Referring to FIG. 1, which shows a block diagram of an apparatus according to one embodiment of the present invention. In the embodiment, the apparatus 10 comprises a high-priority queue 12, a low-priority queue 14, a history counter 16 and a scheduling module 18. Agents 100-106 share resources in a source device 110, such as a dynamic random access memory, by issuing requests to the apparatus 10. The apparatus 10 receives the requests and schedules the received requests to allow these agents 100-106 accessing the source device.

In the embodiment, requests issued by agents 100 and 102 are collected in the high-priority queue 12, and requests issued by agents 104 and 106 are collected in the low-priority queue 14. The requests in high-priority queue 12 have higher priority than those in the low-priority queue 14. Further, the requests in the low-priority queue 14 cannot be granted until the high-priority queue is empty. Thus, the agents 104 and 106 have lower priorities in accessing the source device 110. The length of the period during which the source device 110 is accessed by request of the agents 104 or 106 should be properly determined. An improper length of the period causes either an unexpected stall of the request of the high-priority agents, or inefficient data access of the low-priority agents.

To determine a proper length of the period, the history counter 16 stores an information related to one requesting interval between two adjacent high-priority requests (i.e., requests collected in the high-priority queue 12). More particularly, the history counter 16 counts how many clocks are passed since the previous high-priority request has arrived. The history counter 16 stores the result of counting as the requesting interval and starts another counting when a new high-priority request is arrived.

However, the history counter 16 might further store information other than the requesting interval. For example, several requesting intervals, or an average value of the requesting intervals might be stored as the information. Even more, weightings could be applied on the requesting intervals, and the weighted requesting intervals are added together to obtain the average value of the requesting intervals. In the present invention, the data contained in the information could be referred as available time.

The scheduling module 18 schedules the high-priority requests and the low-priority requests according to the information stored in the history counter 16. The scheduling module 18 grants operation of requests in the high-priority queue 12 first of all. After the high-priority queue 12 is empty, the scheduling module 18 starts to schedule the requests in the low-priority queue 14.

Specifically, when the information stored in the history counter 16 indicates that there is enough time for operation of a low-priority request, the low-priority quest is granted. However, if the information indicates that there is not enough time for operation of a complete low-priority request, the scheduling module 18 determines whether a first part of the low-priority request should be granted. If there is enough time for operation of the first part of the low-priority request, the low-priority request is divided into the first part and at least another part, and the first part of the low-priority request is granted to request the source device 110.

Figure 2:
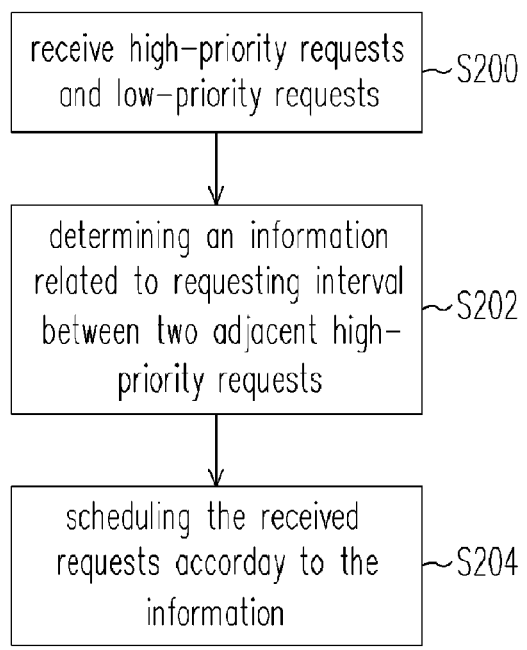
FIG. 2 is a flow chart shown a scheduling method according to one embodiment of the present invention.

Referring to FIG. 2, which shows a flow chart of a scheduling method according to one embodiment of the present invention. The scheduling method could be used for scheduling requests to a source device. First of all, several requests including high-priority requests and/or low-priority requests are received (Step S200). After that, an information related to a requesting interval between two adjacent high-priority requests as described before is stored (Step S202), and the received requests are scheduled according to the information (Step S204).

Figure 3:
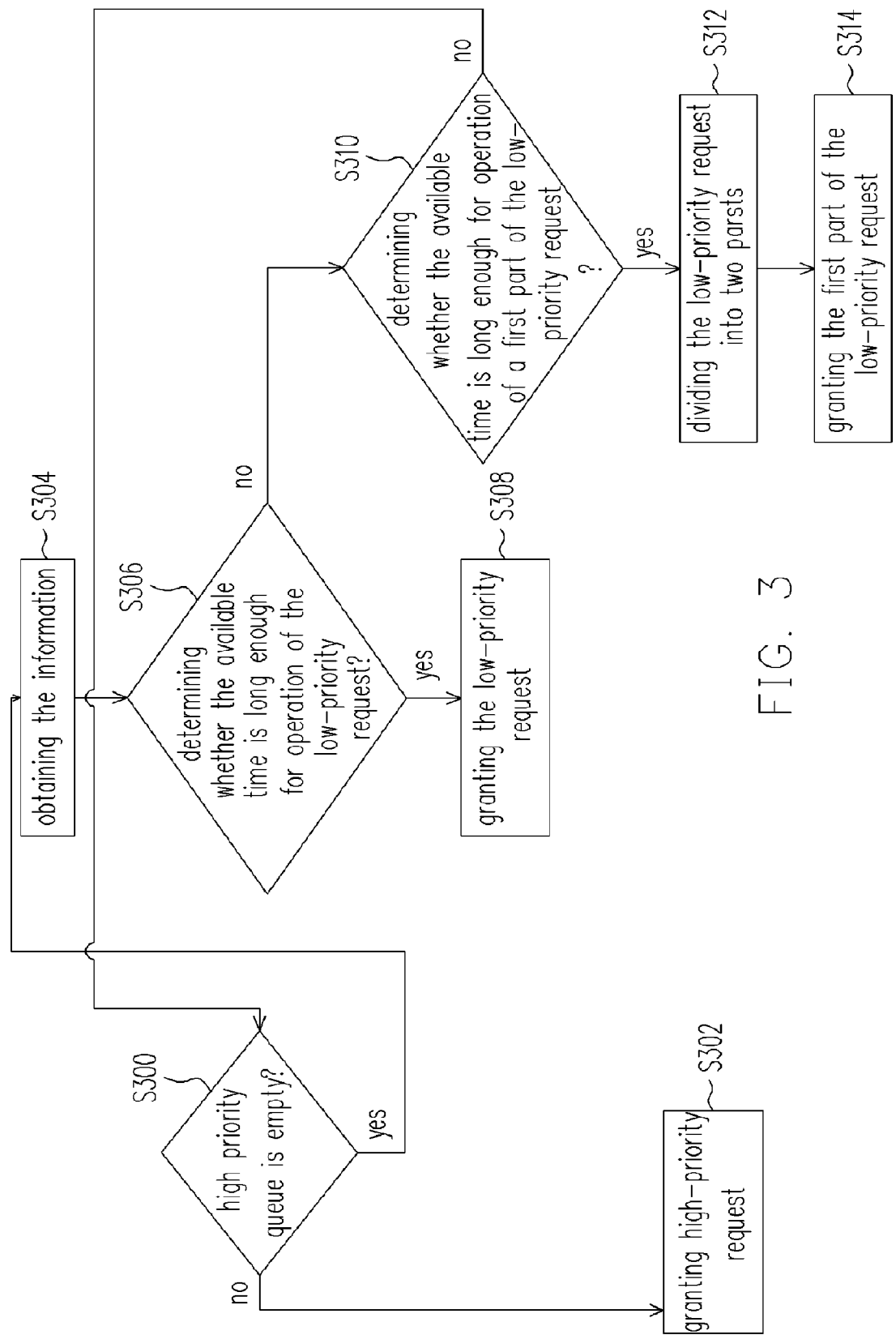
FIG. 3 is a flow chart shown a detailed flow in the step S204 of FIG. 2 according to one embodiment of the present invention.

For more detailed scheduling process, please refer to FIG. 3, which is a flow chart shown a detailed flow in the step S204 of FIG. 2 according to one embodiment of the present invention.

In the embodiment, the high-priority queue storing the high-priority requests is firstly checked to see if it is empty (Step S300). When the high-priority queue is not empty, the high-priority requests are granted in proper order (Step S302). However, if the high-priority queue is empty, the above-mentioned information is obtained (Step S304) and scheduling of low-priority requests therefore begins.

After obtaining the above-mentioned information, the information is checked to determine whether the available time contained in the information is long enough for operation of the low-priority request (Step S306). If the available time is long enough for operation of a complete low-priority request, the low-priority request is granted (Step S308).

However, when the available time is not long enough for operation of a complete low-priority request, the low-priority request is considered to be divided into several parts. For example, as shown in step S310, the low-priority request is checked and a first part of the low-priority request, which can be finished in the available time, is determined. If the available time cannot support operation of any part of the low-priority request, the flow goes back to Step S300. However, if the available time is enough for operation of a first part of the low-priority request, the low-priority request is divided into two parts and one of the parts is the first part (Step S312). After dividing the low-priority request, the first part of the low-priority request is granted to access the source device, and another part of the low-priority request remains in the low-priority queue waiting next grant.

Accordingly, in the present invention, the proper length of the period during which the source device is accessed by the request of a low-priority agent is determined by estimation of the requesting interval between the last and the oncoming high-priority request. This optimizes the efficiency of data access of the low-priority agent and minimizes the possibility of stall of the high-priority requests.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. An apparatus for scheduling requests to a source device, comprising:
    a high-priority request queue for storing a plurality of high-priority requests to the source device;
    a low-priority request queue for storing a low-priority request to the source device, wherein a priority of each of the high-priority requests is higher than the priority of the low-priority request;

a history counter for storing an information related to at least one requesting interval between two adjacent high-priority requests; and a scheduling module for scheduling the high-priority requests and the low-priority request according to the information.

2. The apparatus of claim 1, wherein the source device comprises a dynamic random access memory.

3. The apparatus of claim 1, wherein when the information indicates there is enough time for operation of a first part of the low-priority request, the low-priority request is divided into the first part and at least another part, and the first part of the low-priority request is granted to request the source device.

4. The apparatus of claim 1, wherein the history counter further provides an average value of a plurality of requesting intervals as the information.

5. The apparatus of claim 4, wherein the average value is obtained by weighting each of the requesting intervals and adding the weighted requesting intervals together.

6. A scheduling method for scheduling requests to a source device, comprising:

receiving a plurality of high-priority requests and a low-priority request, wherein a priority of each of the high-priority requests is higher than the priority of the low-priority request;

storing an information related to at least one requesting interval between two adjacent high-priority requests; and scheduling the high-priority requests and the low-priority request according to the information.

7. The scheduling method of claim 6, wherein when the information indicates there is enough time for operation of a first part of the low-priority request, the low-priority request is divided into the first part and at least another part, and the first part of the low-priority request is granted to request the source device.

8. The scheduling method of claim 6, wherein the information comprises an average value of a plurality of requesting intervals.

9. The scheduling method of claim 8, wherein the average value is obtained by weighting each of the requesting intervals and adding the weighted requesting intervals together.

* * * * *